(12) United States Patent
Masaki et al.

(10) Patent No.: US 9,804,605 B2
(45) Date of Patent: Oct. 31, 2017

(54) POSITION IDENTIFICATION DEVICE AND MOBILE ROBOT PROVIDED WITH SAME

(71) Applicant: Hitachi Industrial Equipment Systems Co., Ltd., Chiyoda-ku, Tokyo (JP)

(72) Inventors: Ryoso Masaki, Tokyo (JP); Shuichi Maki, Tokyo (JP); Takuya Naka, Tokyo (JP); Kazuto Shirane, Tokyo (JP); Kohsei Matsumoto, Tokyo (JP)

(73) Assignee: Hitachi Industrial Equipment Systems, Co., Ltd., Tokyo (JP)

( * ) Notice: Subject to any disclaimer, the term of this patent is extended or adjusted under 35 U.S.C. 154(b) by 55 days.

(21) Appl. No.: 14/778,145

(22) PCT Filed: Mar. 4, 2014

(86) PCT No.: PCT/JP2014/055386
§ 371 (c)(1),
(2) Date: Sep. 18, 2015

(87) PCT Pub. No.: WO2014/156502
PCT Pub. Date: Oct. 2, 2014

(65) Prior Publication Data
US 2016/0282873 A1   Sep. 29, 2016

(30) Foreign Application Priority Data
Mar. 29, 2013 (JP) .................. 2013-072203

(51) Int. Cl.
G05D 1/02 (2006.01)
G01S 17/93 (2006.01)
G01S 17/06 (2006.01)

(52) U.S. Cl.
CPC .............. *G05D 1/024* (2013.01); *G01S 17/06* (2013.01); *G01S 17/936* (2013.01)

(58) Field of Classification Search
CPC ........ G05D 1/024; G01S 17/936; G01S 17/06
See application file for complete search history.

(56) References Cited

U.S. PATENT DOCUMENTS 5,461,357 A    10/1995 Yoshioka et al.
7,616,101 B2 * 11/2009 Kuttenberger ........ G01S 13/931
                                                    180/167

(Continued)

FOREIGN PATENT DOCUMENTS

JP    5-205198 A    8/1993
JP    2004-280451 A    10/2004

(Continued)

OTHER PUBLICATIONS

Japanese-language Office Action issued in counterpart Japanese Application No. 2013-072203 dated Aug. 2, 2016 (Four (4) pages).

(Continued)

*Primary Examiner* — Richard M Camby
(74) *Attorney, Agent, or Firm* — Crowell & Moring LLP (57) ABSTRACT

Position identification means (7) for estimating the position of a mobile robot (1) includes a laser distance sensor (6) that measures a distance from the mobile robot (1) to an object, means for recognizing an object from data of the measured distance from the mobile robot (1) to the object and map data, travel area storage means (12) for storing a travel area of the mobile robot (1), specified area storage means (13) for storing a specified area that is separate from the travel area of the mobile robot (1), and object determination means (14) for determining whether an object is present within the travel area of the mobile robot (1) that is stored in the travel area storage means (12).

6 Claims, 9 Drawing Sheets

(56) References Cited

U.S. PATENT DOCUMENTS

| | | | |
|---|---|---|---|
| 8,164,627 B1 * | 4/2012 | Hahn | ........................ B60R 1/00 348/148 |
| 2006/0184274 A1 | 8/2006 | Sakai et al. | |
| 2008/0201014 A1 | 8/2008 | Sonoura | |

FOREIGN PATENT DOCUMENTS

| | | |
|---|---|---|
| JP | 2007-200070 A | 8/2007 |
| JP | 2008-200770 A | 9/2008 |
| JP | 2009-109200 A | 5/2009 |
| JP | 2012-150828 A | 8/2012 |
| JP | 2012-256344 A | 12/2012 |

OTHER PUBLICATIONS

International Search Report (PCT/ISA/210) dated May 13, 2014 with English-language translation (four (4) pages).

* cited by examiner

POSITION IDENTIFICATION DEVICE AND MOBILE ROBOT PROVIDED WITH SAME

TECHNICAL FIELD

The present invention relates to a position identification device that estimates the position and the angle of a mobile body on a map, according to distance data of the surrounding environment that is measured by a distance sensor, and map data of the surrounding environment, and a mobile body with the same. In the present specification, the term of "mobile body" and the term of "mobile robot" are used together, but the "mobile robot" is used as an example of the "mobile body", and thus there is no substantial difference as an invention idea.

BACKGROUND ART

In the related art, a position attitude estimation device has been known which estimates the position and the angle of a mobile body, using distance data and map data that are measured by a laser distance sensor. For example, Patent Document 1 (Japanese Patent Application Laid-Open No. 2009-109200) relates to a technique of recognizing the position attitude of a mobile robot in the real environment, used in autonomous movement control of the mobile robot, and in particular, discloses a technique of calculating the position attitude of a mobile robot, using sensing data from a distance sensor mounted in the mobile robot and a two-dimensional environment map representing geometrical conditions of the environment, in order to cause the mobile robot to automatically reach the destination without human operation.

CITATION LIST

Patent Documents

Patent Document 1: Japanese Patent Application Laid-Open No. 2009-109200

SUMMARY OF THE INVENTION

Problem to be Solved by the Invention

In the technique described in Patent Document 1, a method is described which estimates the position attitude of a mobile robot by matching sensing data measured by the distance sensor and the environment map, but since there is a problem in that the amount of data processing becomes enormous and computation time becomes longer in a typical matching method, reduction of the amount of processing has been desired. Therefore, except for estimating the position attitude, a proposal of performing processes using the map has not been made.

The present invention has been made in view of the above problems, and an object of the present invention is to provide a position identification device and a mobile robot provided with the same, in which the position identification device estimates the position attitude of a mobile body by matching distance data and map data in a range of a predetermined area (a travel area, or a specific area such as a specified area) which is set in advance, and classifies the type of an object which is irradiated with light by a laser distance sensor, by comparing again the distance data and the map data using the estimated position attitude.

Means for Solving the Problems

A position identification device according to the present invention is a position identification device that identifies an object provided in an ambient environment from reflected light of emitted laser light, and estimates a position and an angle of a mobile body which is movably disposed within a surrounding environment, in which map data of the surrounding environment where the mobile body travels is stored, and the position identification device includes a distance sensor that measures a distance from the mobile body to an object provided in the ambient environment; means for recognizing the object provided in the ambient environment, according to distance data from the mobile body to the object that is measured by the distance sensor and the map data; travel area storage means for storing a travel area of the mobile body; and object determination means for determining whether or not the object is placed within the travel area of the mobile body that is stored in the travel area storage means.

A position identification device according to the present invention is a position identification device that identifies an object provided in an ambient environment from reflected light of emitted laser light, and estimates a position and an angle of a mobile body which is movably disposed within a surrounding environment, in which map data of the surrounding environment where the mobile body travels is stored, and the position identification device includes a distance sensor that measures a distance from the mobile body to an object provided in the ambient environment; means for recognizing the object provided in the ambient environment, according to distance data from the mobile body to the object that is measured by the distance sensor and the map data; travel area storage means for storing a travel area of the mobile body; specific area storage means for storing a specific area other than the travel area of the mobile body; and object determination means for determining whether or not the object is placed within the travel area of the mobile body that is stored in the travel area storage means or the specific area that is stored in the specific area storage means.

A position identification device according to the present invention is a position identification device that includes a distance sensor for measuring a distance to a surrounding object, and estimates a position and an angle of a mobile body, by using map data of a surrounding environment where the mobile body travels and distance data that is measured by the distance sensor, and the position identification device includes specific area storage means for storing a specific area of the map data; and object determination means for determining whether or not the object is placed within the specific area, by using the map data and the estimated position and angle.

The position identification device according to the present invention performs measurement of the distance from the mobile body to the object a plurality of times by the distance sensor, and classifies whether the object is a mobile body or a stationary body, based on a plurality of pieces of the distance data obtained by the measurement performed the plurality of times.

A mobile robot according to the present invention is a mobile robot including the position identification device; and a control device that automatically controls autonomous traveling, in which the control device determines whether or not the mobile robot is close to the object according to the distance data, and changes a travel route, based on a determination as to whether or not the object determined by the object determination means is placed within the travel area.

In the mobile robot according to the present invention, when the mobile robot is determined to be close to the object by the distance data, the control device changes a travel speed limit of the mobile body by the classification of the object.

The mobile robot according to the present invention further includes a communication device that performs reporting to the outside, when the object determination means determines that the object is placed within the specific area.

Advantageous Effect of the Invention

The mobile robot according to the present invention can easily classify objects into an object matching the map, an object present on a traveling path, or an object present in a specific area of the map, by comparing the distance data with the map data, based on the estimated position and angle, and according to the present invention, a control system can be constructed that controls a mobile body so as to travel safely and very conveniently while avoiding obstacles.

MODES FOR CARRYING OUT THE INVENTION

Figure 1:
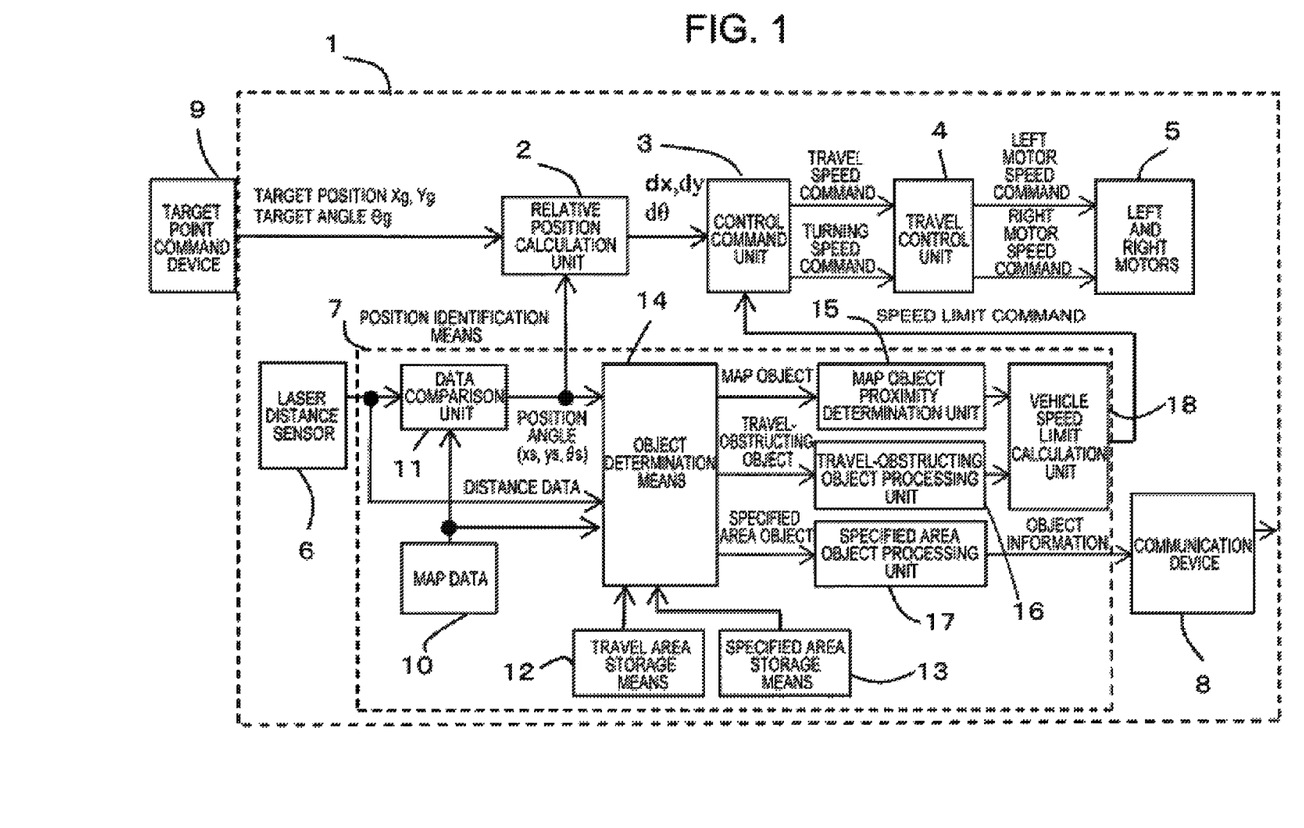
FIG. 1 is a block diagram illustrating a configuration of a mobile robot of the present embodiment.

FIG. 1 is a block diagram illustrating a configuration of a mobile robot 1 as a mobile body according to an example of the present embodiment. As illustrated in FIG. 1, the mobile robot 1 includes a relative position calculation unit 2 that receives target position Xg, Yg, and target angle θg which are output from a target point command device 9, a control command unit 3 that receives a control command dx, dy, and dθ that are output from the relative position calculation unit 2, a travel control unit 4 that receives a travel speed command and a turning speed command that are output from the control command unit 3, left and right motors 5 which are travelling means respectively receiving a left motor speed command and a right motor speed command which are output from the travel control unit 4, a laser distance sensor 6 that measures a distance from the mobile robot 1 to a surrounding environment (a wall, a device, an object A, or the like) which will be described later, position identification means 7 for estimating the position and the angle of the mobile robot 1 from the map data 10 of the surrounding environment and distance data of the surrounding environment that is measured by the laser distance sensor 6, and a communication device 8 for communicating with the outside for notification.

The position identification means 7 which is the position identification device stores the map data 10 of the surrounding environment where the mobile robot 1 travels, and includes a data comparison unit 11 that compares the map data 10 with the information on the position up to the surrounding environment such as a wall, a device, and an object that are measured by the laser distance sensor 6. The position identification means 7 divides areas in advance into "travel area" and "specified area" which is a specific area, as illustrated in FIG. 3B, in order to estimate a positional relationship between the mobile robot 1 and the ambient environment. The "travel area" refers to an area where the mobile robot 1 travels, and the "specified area" refers to a place in which a carriage, an object, and the like are placed. Therefore, the position identification means 7 includes travel area storage means 12 for storing the travel area of the mobile robot 1, and specified area storage means 13 which is specific area storage means for storing a specified area which is a specific area other than the travel area of the mobile robot 1. The object determination means 14 determines the presence or absence of the "object" from information on the surrounding environment such as the walls, devices, and objects that are measured by the laser distance sensor 6. A process of identifying whether the "object", that is determined to be present with reference to each piece of area information from the travel area storage means 12 and the specified area storage means 13, is the map object, the travel-obstructing object, or the specified area object, is performed by respective processing units, the map object proximity determination unit 15, the travel-obstructing object processing unit 16, and the specified area object processing unit 17. Since it is necessary to pay attention to the map object and travel-obstructing object as a travelling mobile robot 1, information is output to the vehicle speed limit calculation unit 18, and if it is determined that it is necessary to apply a vehicle speed limit based on the calculation of information in the vehicle speed limit calculation unit 18, a speed limit command is output to the control command unit 3.

The distance data measured by the laser distance sensor 6 is compared with the map data 10, and the data of the position and the angle of the mobile robot 1 is obtained. The data of the position and the angle of the mobile robot 1 after comparison is performed by the data comparison unit 11 the distance data measured by the laser distance sensor 6, and the map data 10 are input to the object determination means 14. The object determination means 14 determines whether the "object" that has been determined to be present is a map object, a travel-obstructing object, or a specified area object, as described above, with reference to respective pieces of area information from the travel area storage means 12 and the specified area storage means 13. The map object information is processed in the map object proximity determination unit 15, the travel-obstructing object information is processed in the travel-obstructing object processing unit 16, and the specified area object information is processed in the specified area object processing unit 17.

Figure 2:
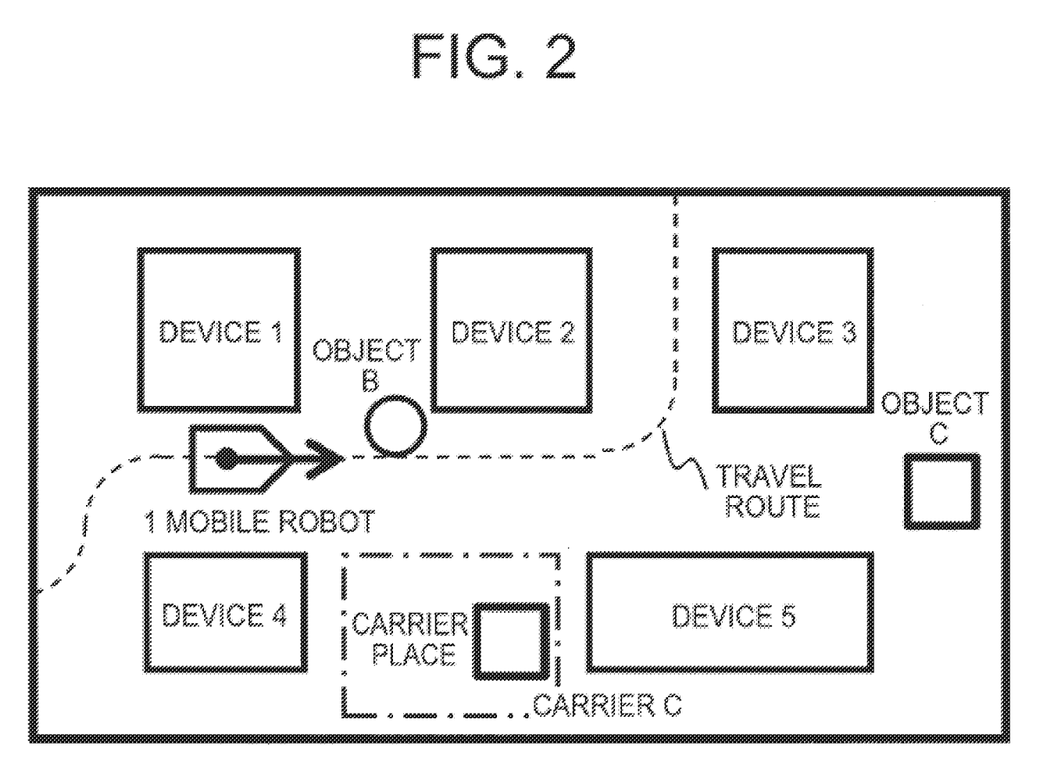
FIG. 2 is an explanatory view illustrating a travel route of the mobile robot and the state of an ambient environment.

FIG. 2 is an explanatory view illustrating a travel route of the mobile robot 1 and the state of an ambient environment. As illustrated in FIG. 2, a wall, devices 1 to 5, an object B, a carriage C, and an object C are present as objects in the surrounding environment where the mobile robot 1 can travel. Here, the object B is placed on the travel route of the mobile robot 1 indicated by a dotted line, and the carriage C is placed in the carriage place. Thus, the mobile robot 1 is intended to travel while avoiding the object B so as not to be in contact with the object B, when traveling the travel route indicated by the dotted line.

Figure 3A:
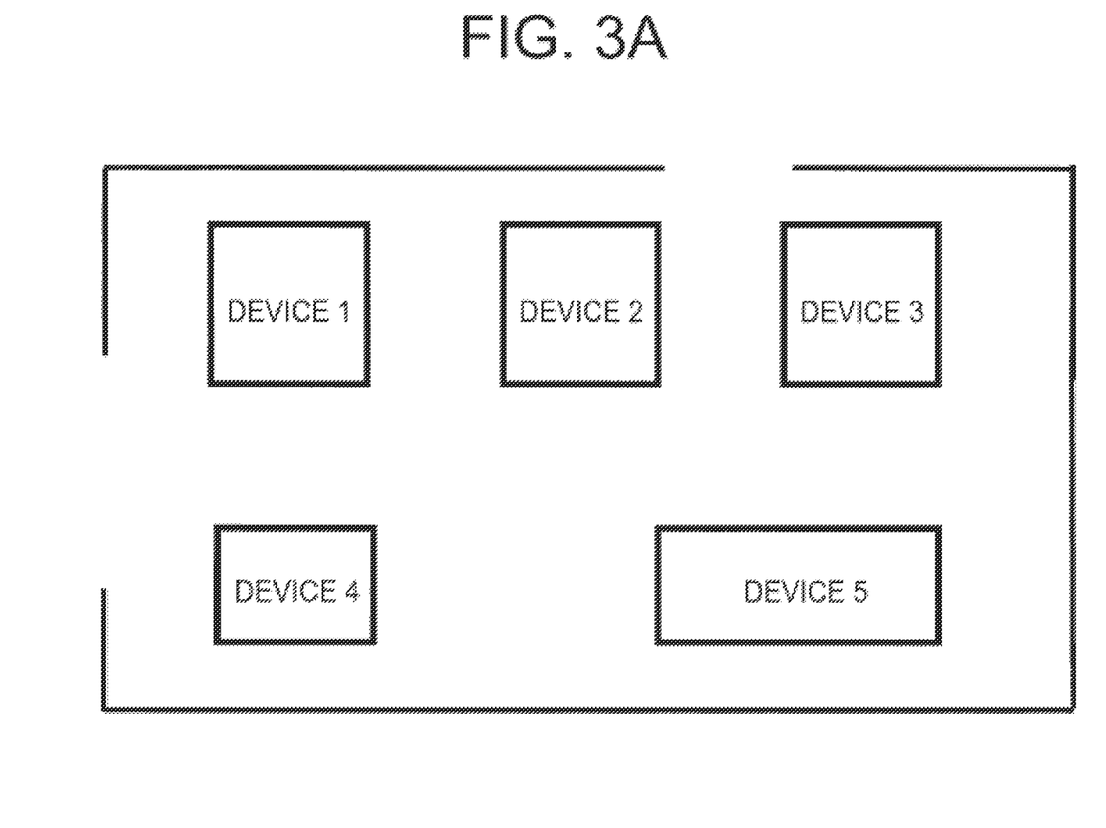
FIG. 3A is an explanatory view illustrating map data of a surrounding environment.
Figure 3B:
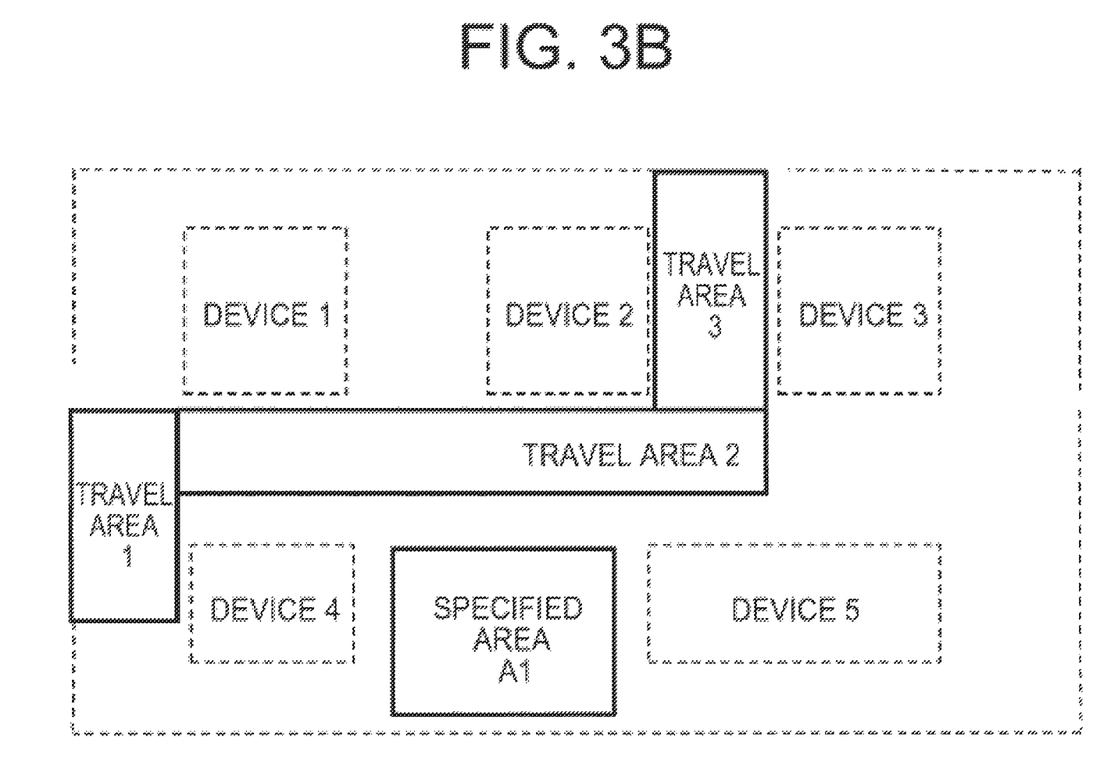
FIG. 3B is an explanatory view illustrating a travel area and a specified area of the mobile robot of the map data.

FIG. 3A illustrates map data of the surrounding environment. FIG. 3B illustrates the travel areas 1, 2, and 3 of the mobile robot 1 and the specified area A1 of the map data. It is assumed that the map data of the surrounding environment of FIG. 3A is stored in advance. The travel areas 1, 2, and 3 and the specified area A1 of FIG. 3B can be stored in the travel area storage means 12 and the specified area storage means 13 by a predetermined operation of the user.

Figure 4:
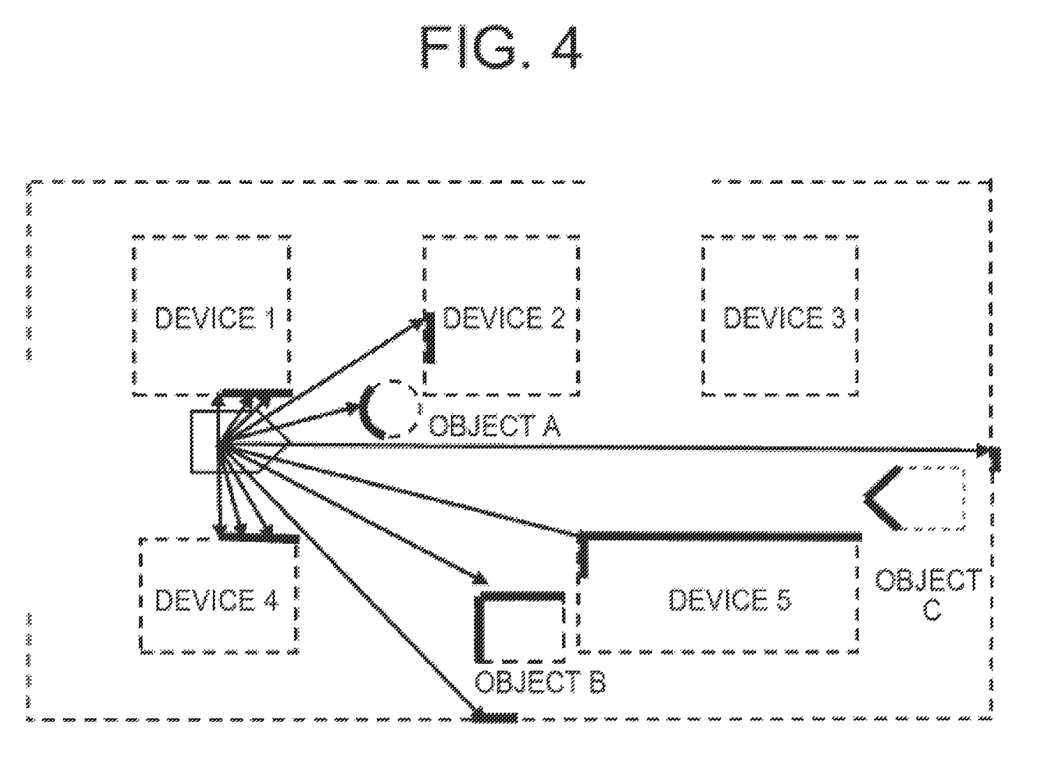
FIG. 4 is an explanatory view illustrating a state in which an object or the like is irradiated with a laser from a laser distance sensor provided in the mobile robot and the object is recognized.

FIG. 4 illustrates a state in which the objects A, B and the like are irradiated with a laser from the laser distance sensor 6 included in the mobile robot 1, and the objects are recognized. As indicated by arrows in FIG. 4, the laser light, emitted from the laser distance sensor 6 in the mobile robot 1, is applied in a range of 90 degrees to the left and right, in other words, in a range of 180 degrees, with the front side of the mobile robot 1 as a reference. Then, it is possible to measure distances to the objects A, B and the boundary of the surrounding environment, from the light reflected therefrom, as indicated by thick black lines. The detection state illustrated in FIG. 4 is a result obtained by comparing the distance data of the laser distance sensor 6 and the map data 10 through a matching process, and estimating the position and the attitude of the mobile robot 1. In other words, it is possible to estimate the position and the attitude of the mobile robot 1 from the distance data matching the map data 10.

The position estimation result in FIG. 4 is classified into FIGS. 5A to 5D. In FIG. 5A to FIG. 5D, distance data pieces are respectively classified by thick lines.

Figure 5A:
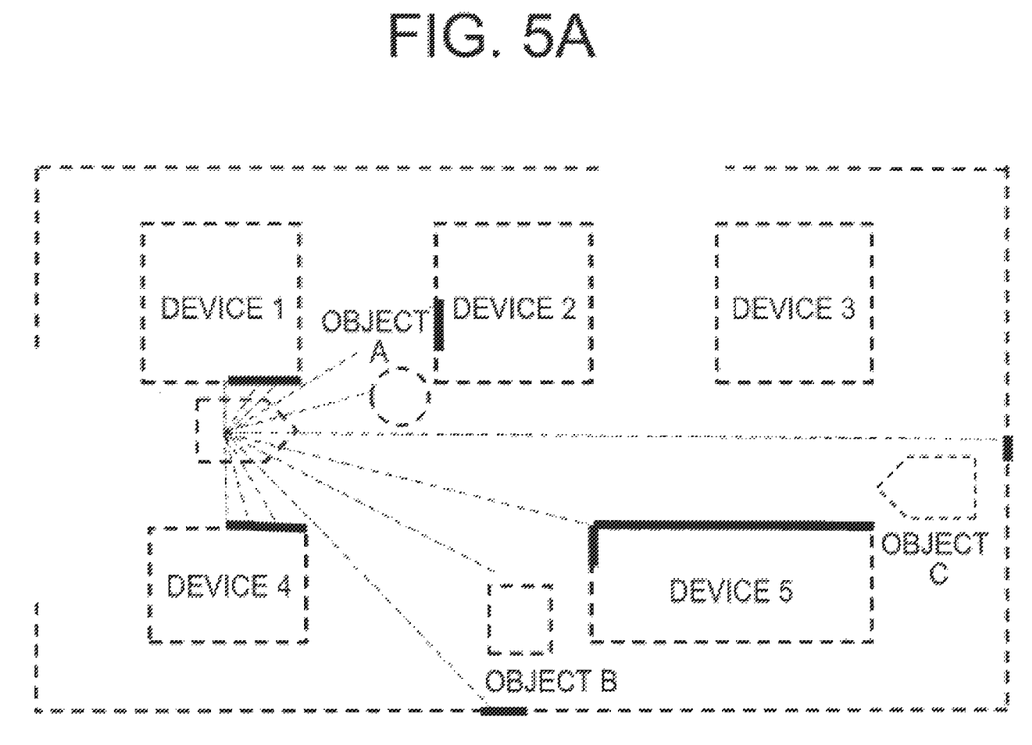
FIG. 5A is an explanatory view illustrating a state of performing measurement of a distance to a map object as seen from the mobile robot 1 for comparison with FIG. 3A.

FIG. 5A illustrates distance data matching map data 10, by comparing again the distance data and the map data 10 illustrated in FIG. 3A. Since these pieces of data are described on the map, they can be regarded as a fixed object or a stationary object.

Figure 5B:
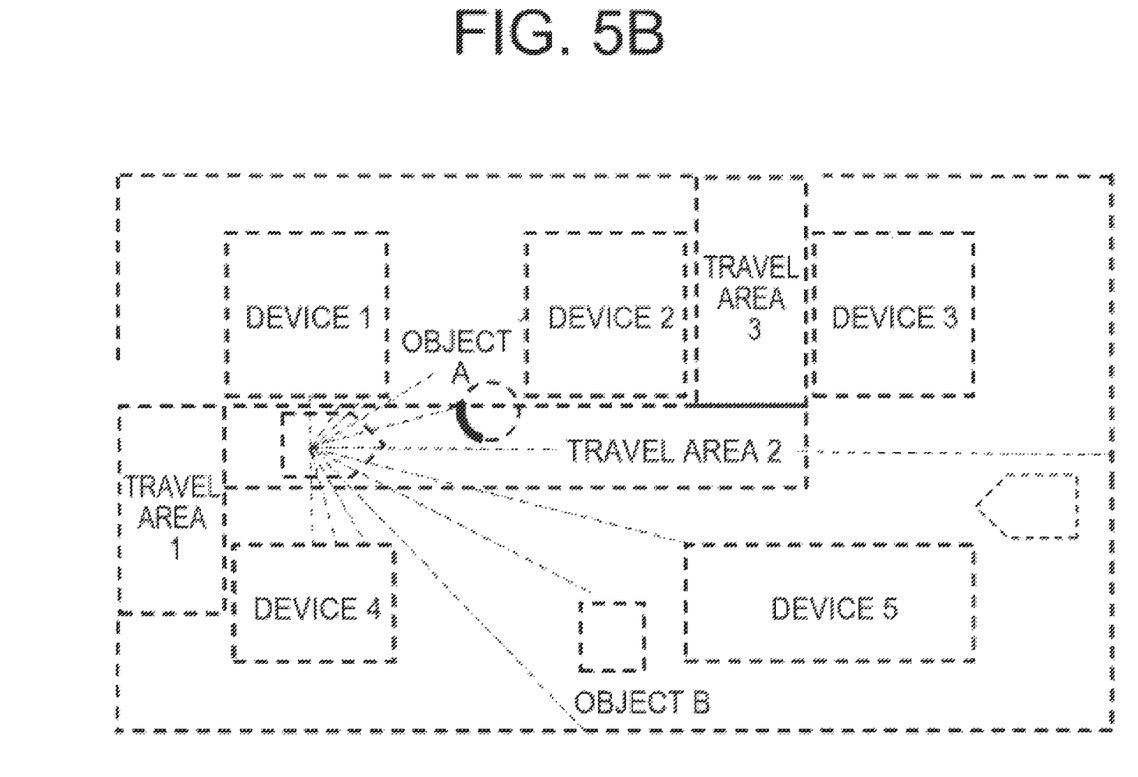
FIG. 5B is an explanatory view illustrating a state where it is determined that an object A is placed within a travel area that is stored in advance.

FIG. 5B illustrates a state where it is determined that an object A is placed within a travel area that is stored in advance. The object A present in the travel area 2 may be an obstacle to the traveling of the mobile robot 1. In other words, since the object A is present on the travel area where travelling is planned future, when the mobile robot 1 travels on the planned travel route, there is a possibility of collision. Incidentally, although the approximate size of the object A can be estimated from the distance data, no further details are to be specified.

Incidentally, in a case where the travel area 2 is stored in the travel area storage means 12, as illustrated in FIG. 4, an "object" present in the travel area 2 is extracted, from "objects" that are determined to be present. In the embodiment, the travel areas are set at three positions, the recognition of "object" present in the travel area may be performed when the mobile robot 1 enters the travel area. In other words, the recognition of "object" present in the travel area 1 is performed when the mobile robot 1 enters this area from the entrance, and the recognition of the "object" present in the travel area 3 is performed until the mobile robot 1 enters the travel area 3 from the end of the travel area 2. Furthermore, during traveling, when an object enters a travel area, it is necessary to cope with the entering.

Figure 5C:
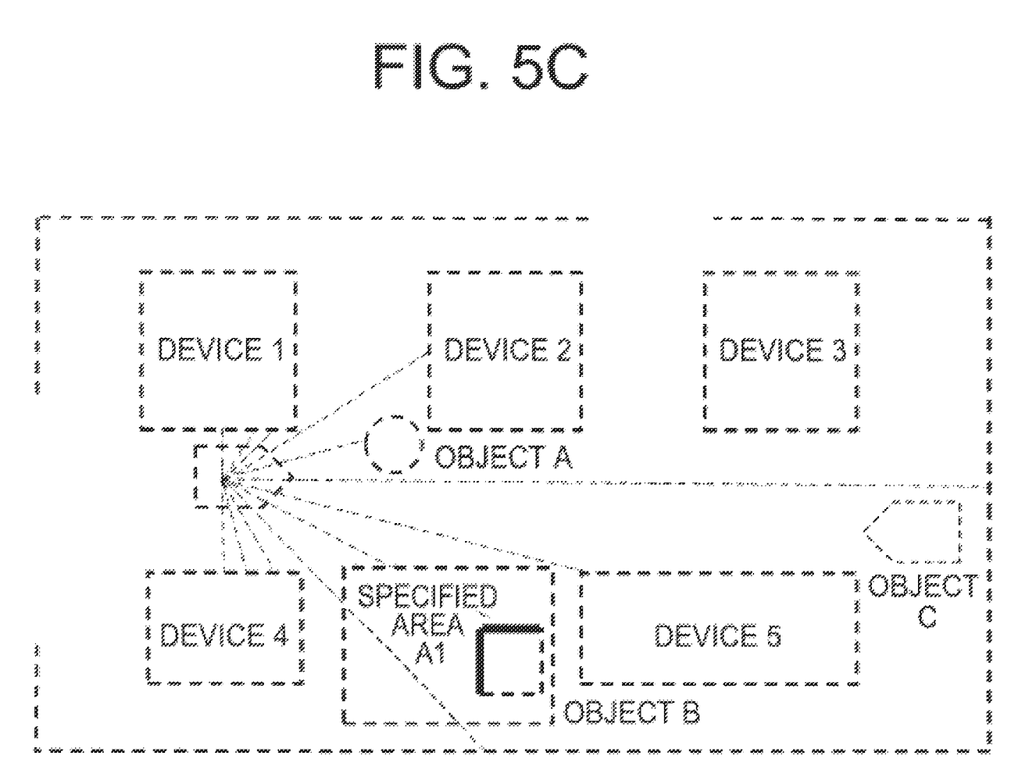
FIG. 5C is an explanatory view illustrating a state where it is determined that a carriage B is placed within a specified area A1 that is stored in advance.

FIG. 5C illustrates a state where it is determined that a carriage B is placed within a specified area A1 that is stored in advance. Although the carriage B in the specified area A1 is not an obstacle to the traveling of the mobile robot 1, when the specified area A1 is used as a carriage place, what has been detected can be regarded as the carriage B. Thus, if the carriage is present in the specified area A1 that is a carriage place, it means that the mobile robot 1 is required to transport the carriage. Thus, when the mobile robot 1 detecting it is not performing other work, the mobile robot 1 can tow the carriage B, and automatically transport the carriage B to a specified transport destination. Further, when the mobile robot 1 is performing other work, or is moving to another place, it is possible to notify the higher control device present in the outside through communication that the carriage B has been found. Incidentally, it is possible to determine that an object other than the carriage is placed, based on the size of the object.

Figure 5D:
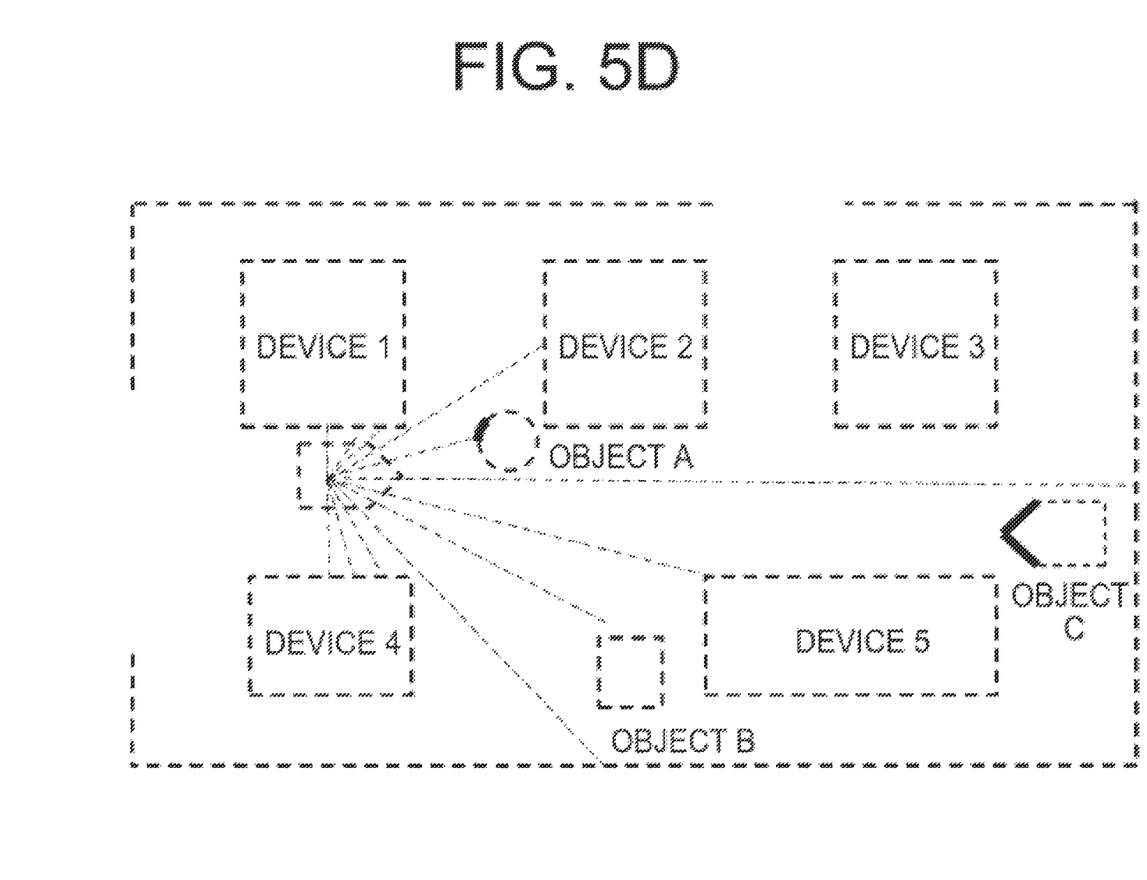
FIG. 5D is an explanatory view illustrating a state where it is determined that an object is present in an area other than travel areas 1, 2, and 3 and the specified area.

FIG. 5D illustrates a state where it is determined that an object is present in an area other than travel areas 1, 2, and 3 and the specified area. While the presence of the "object" is recognized, the object, that is not present in either the travel area or the specified area and is not the map object, is determined as another object and processed.

According to the above configuration, in position identification means 7 for estimating a position and an angle of a mobile robot 1 which is movably disposed within a surrounding environment, in which map data of the surrounding environment where the mobile robot 1 travels is stored, the position identification means 7 includes a laser distance sensor 6 that measures a distance from the mobile robot 1 to an object provided in the surrounding environment, means for recognizing the object provided in the surrounding environment, according to distance data from the mobile robot 1 to the object that is measured by the laser distance sensor 6 and the map data, travel area storage means 12 for storing a travel area of the mobile robot 1, specified area storage means 13 which is specific area storage means for storing a specific area other than the travel area of the mobile robot 1, and object determination means 14 for determining whether or not the object is placed within the travel area of the mobile robot 1 that is stored in the travel area storage means 12 or the specified area which is the specific area stored in the specified area storage means 13 which is the specific area storage means. This allows simple classification of the object into an object in which distance data matches the map data 10, an object that is on the travel area, an object present in the specific area, and an object present in another area, by comparing again the distance data and the map data 10 on the basis of the estimated position and attitude. In contrast to the related art in which the mobile robot is controlled, based on short distance data indicating that an object is approaching to the mobile robot, among distance data pieces, since it is possible to provide the types of distance data pieces indicating approaching objects as information, the mobile robot 1 can determine whether to decelerate or stop, thereby allowing better control of the mobile robot 1 to be performed.

Further, the position identification means 7 of the present embodiment performs measurement of the distance from the mobile robot 1 to the object a plurality of times by the laser distance sensor 6, and can classify whether the object is a mobile body or a stationary body, based on a plurality of pieces of the distance data obtained by the measurement performed the plurality of times. Further, a control device determines whether or not the mobile robot 1 is close to the object according to the distance data, and changes a travel route, based on a determination as to whether or not the object determined by the object determination means 14 is placed within the travel area. In addition, when it is determined that the mobile robot 1 is close to the object according to the distance data, the control device decelerates the mobile robot 1 and stops the mobile robot 1 before the mobile robot 1 collides with the object. Note that when the object that is close to the mobile robot 1 matches the map data 10, the object is regarded as a stationary object or a stopped object, such that it is also possible to reduce the deceleration rate of the travel speed in a range in which safe driving can be guaranteed.

DESCRIPTION OF REFERENCE NUMERALS

1 MOBILE ROBOT
2 RELATIVE POSITION CALCULATION UNIT
3 CONTROL COMMAND UNIT
4 TRAVEL CONTROL UNIT
5 LEFT AND RIGHT MOTORS
6 LASER DISTANCE SENSOR (DISTANCE SENSOR)
7 POSITION IDENTIFICATION MEANS (POSITION IDENTIFICATION DEVICE)
8 COMMUNICATION DEVICE
9 TARGET POINT COMMAND DEVICE
10 MAP DATA
11 DATA COMPARISON UNIT
12 TRAVEL AREA STORAGE MEANS
13 SPECIFIED AREA STORAGE MEANS (SPECIFIC AREA STORAGE MEANS)
14 OBJECT DETERMINATION MEANS
15 MAP OBJECT PROXIMITY DETERMINATION UNIT
16 TRAVEL-OBSTRUCTING OBJECT PROCESSING UNIT
17 SPECIFIED AREA OBJECT PROCESSING UNIT
18 VEHICLE SPEED LIMIT CALCULATION UNIT

The invention claimed is:

1. A position identification device to be mounted in a mobile body, that includes a distance sensor for measuring a distance to a surrounding object of the mobile body, and estimates a position and an angle of the mobile body, by using map data of a surrounding environment and distance data that is measured by the distance sensor, the position identification device comprising:
    specific area storage means for storing a place where a specific object as a target of a transport request is present as a specific area in the map data; and
    object determination means for determining whether or not the object is present within the specific area, by using the map data and the estimated position and angle, and for determining whether or not the object determined to be present within the specific area is the specific object, by specifying an approximate size of the object from the distance data.

2. The position identification device according to claim 1, wherein the object determination means includes a function of performing instruction for the mobile body to transport the specific object to a specified destination, when the object present in the specific area is the specific object, or
notifying detection of the specific object to an external device.

3. The position identification device according to claim 1, wherein the specific object is a carriage.

4. The position identification device according to claim 1, wherein the mobile body is a mobile robot.

5. The position identification device according to claim 2, wherein the specific object is a carriage.

6. The position identification device according to claim 2, wherein the mobile body is a mobile robot.

* * * * *